United States Patent
He et al.

(10) Patent No.: US 12,095,682 B2
(45) Date of Patent: *Sep. 17, 2024

(54) PDCCH TRANSMISSION IN RACH PROCEDURE FOR REDUCED CAPABILITY DEVICES

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/593,462

(22) PCT Filed: Oct. 5, 2020

(86) PCT No.: PCT/CN2020/119806
§ 371 (c)(1),
(2) Date: Sep. 19, 2021

(87) PCT Pub. No.: WO2022/073147
PCT Pub. Date: Apr. 14, 2022

(65) Prior Publication Data
US 2022/0303071 A1 Sep. 22, 2022

(51) Int. Cl.
*H04L 5/00* (2006.01)
*H04W 72/044* (2023.01)
(Continued)

(52) U.S. Cl.
CPC .......... *H04L 5/001* (2013.01); *H04W 72/044* (2013.01); *H04W 72/23* (2023.01); *H04W 74/006* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 10,849,187 | B2* | 11/2020 | Tsai | H04L 5/0092 |
| 2018/0007667 | A1* | 1/2018 | You | H04L 5/0051 |
| 2018/0076924 | A1 | 3/2018 | Lee et al. | |
| 2018/0279265 | A1 | 9/2018 | Shimezawa et al. | |

(Continued)

FOREIGN PATENT DOCUMENTS

| | | |
|---|---|---|
| CN | 102761863 | 10/2012 |
| CN | 103314612 | 9/2013 |

(Continued)

OTHER PUBLICATIONS

Ericsson, "Enhancements to initial access procedure"; 3GPP TSG-RAN WG1 Meeting #98bis; R1-1910948; Oct. 20, 2019; 17 sheets.

(Continued)

*Primary Examiner* — Xavier S Wong
(74) *Attorney, Agent, or Firm* — Fay Kaplun & Marcin, LLP

(57) ABSTRACT

A base station configures a Physical Downlink Control Channel (PDCCH) for transmission to one or more user equipments (UEs). The base station divides a component carrier (CC) bandwidth into a plurality of sub-bands, transmits a physical random access channel (PRACH) resource on at least one of the sub-bands and transmits a Type1-PDCCH CSS (Physical Downlink Control Channel Common Search Space) set on at least one of the sub-bands, wherein the Type1-PDCCH CSS set corresponds to the PRACH resource.

13 Claims, 7 Drawing Sheets

(51) Int. Cl.
*H04W 72/23* (2023.01)
*H04W 74/00* (2009.01)
*H04W 74/0833* (2024.01)

(56) References Cited

U.S. PATENT DOCUMENTS

| | | | |
|---|---|---|---|
| 2019/0090113 A1 | 3/2019 | Rico Alvarino et al. | |
| 2019/0223145 A1* | 7/2019 | Jung | H04W 68/005 |
| 2019/0364602 A1 | 11/2019 | Yi et al. | |
| 2020/0214006 A1* | 7/2020 | Choi | H04L 1/1861 |
| 2021/0136830 A1* | 5/2021 | Lin | H04W 72/23 |
| 2021/0378026 A1* | 12/2021 | Ohara | H04W 74/02 |
| 2021/0385802 A1* | 12/2021 | Bae | H04W 72/51 |
| 2022/0287076 A1 | 9/2022 | Khoshnevisan et al. | |
| 2022/0312499 A1* | 9/2022 | He | H04W 74/0841 |

FOREIGN PATENT DOCUMENTS

| | | |
|---|---|---|
| CN | 103385019 | 11/2013 |
| CN | 107251635 | 10/2017 |
| CN | 109644504 | 4/2019 |
| CN | 109845177 | 6/2019 |
| CN | 110856180 | 2/2020 |
| CN | 111324877 | 6/2020 |
| CN | 111512575 | 8/2020 |
| WO | 2008/154052 | 12/2008 |
| WO | 2016/164739 | 10/2016 |
| WO | 2019/099393 | 5/2019 |

OTHER PUBLICATIONS

Huawei et al., "Study on User Consent for 3GPP services"; 3GPP TSG-SA WG3 Meeting #100e; draft_S3-201736-r1; Aug. 28, 2020; 3 sheets.

NTT Docomo, Inc., "CR on overlapping with Type1-PDCCH CSS Set", 3GPP TSG RAN WGI Meeting #95, R1-1814200, Nov. 16, 2018, 3 sheets.

Nokia et al., "On design of search space for short PDCCH", 3GPP TSG-RAN WG1 Meeting #87, R1-1612211, Nov. 4, 2016, 6 sheets.

\* cited by examiner

700

| PRACH Subgroup Index | Type1-PDCCH sub-band | Sub-group ID |
|---|---|---|
| 0, 1 (610) | Sub-band 650 | 0, 1 |
| 2, 3 (620) | Sub-band 660 | 0, 1 |
| 4, 5 (630) | Sub-band 670 | 0, 1 |
| 6, 7 (640) | Sub-band 680 | 0, 1 |

US 12,095,682 B2

PDCCH TRANSMISSION IN RACH PROCEDURE FOR REDUCED CAPABILITY DEVICES

BACKGROUND 5G new radio (NR) wireless communications support a variety of different types of user equipment (UEs). For example, in addition to mobile phones, 5G NR supports internet of things (IoT) devices, industrial IoT (IIoT) devices, wearable devices, etc. Some of these devices are known as reduced capability (RedCap) UEs, which have varying wireless capabilities compared to other UEs. There may be situations where the network would like to treat RedCap UEs differently than other types of UEs.

SUMMARY

Some exemplary embodiments are related to a base station of a wireless network having a transceiver configured to connect to a user equipment (UE) and a processor communicatively coupled to the transceiver and configured to perform operations. The operations include dividing a component carrier (CC) bandwidth into a plurality of sub-bands, transmitting a physical random access channel (PRACH) resource on at least one of the sub-bands and transmitting a Type1-PDCCH CSS (Physical Downlink Control Channel Common Search Space) set on at least one of the sub-bands, wherein the Type1-PDCCH CSS set corresponds to the PRACH resource.

Other exemplary embodiments are related to one or more processors configured to perform operations. The operations include dividing a component carrier (CC) bandwidth into a plurality of sub-bands, transmitting a physical random access channel (PRACH) resource on at least one of the sub-bands and transmitting a Type1-PDCCH CSS (Physical Downlink Control Channel Common Search Space) set on at least one of the sub-bands, wherein the Type1-PDCCH CSS set corresponds to the PRACH resource.

Still further exemplary embodiments are related to a method that includes dividing a component carrier (CC) bandwidth into a plurality of sub-bands, transmitting a physical random access channel (PRACH) resource on at least one of the sub-bands and transmitting a Type1-PDCCH CSS (Physical Downlink Control Channel Common Search Space) set on at least one of the sub-bands, wherein the Type1-PDCCH CSS set corresponds to the PRACH resource wherein the PRACH resource and the Type1-PDCCH CSS set are transmitted on different sub-bands.

DETAILED DESCRIPTION

Figure 1:
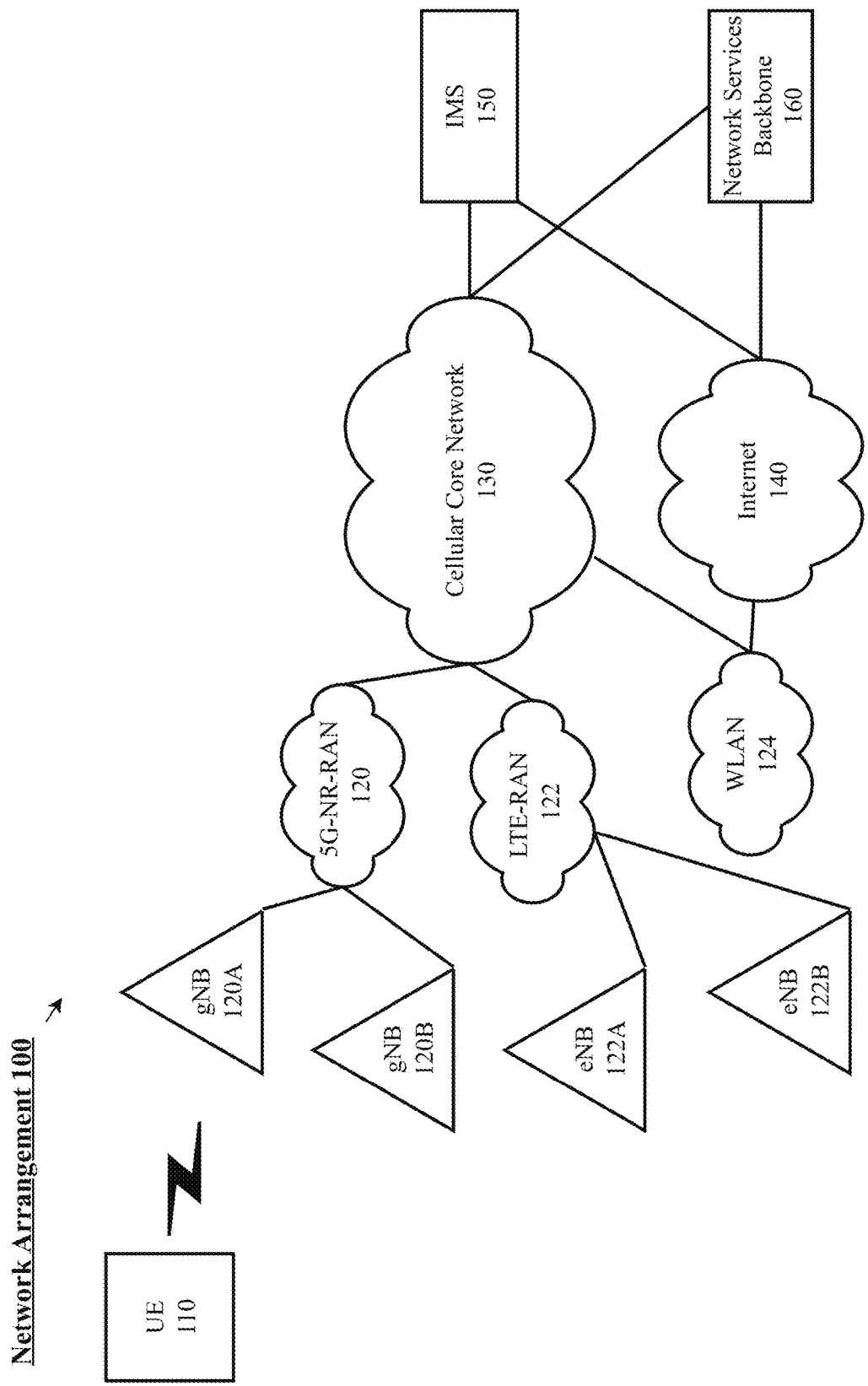
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe PDCCH monitoring by a RedCap UE. For example, the RedCap UE may monitor PDCCH candidates in Type1-PDCCH CSS sets configured by the random access search space for a Downlink Control Information (DCI) format.

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

As noted above, there are various types of UEs, each having different capabilities that may connect to the 5G NR network. Prior to describing the exemplary embodiments, several examples of RedCap UEs and their characteristics will be described. In a first example, devices in industrial settings such as temperature or humidity sensors may be connected industry devices. However, such devices are stationary, are not latency critical, and are fairly uncomplex with respect to their capabilities and hardware. These devices typically do not require the low latency data exchange provided by ultra reliable low latency communication (URLLC) or IIoT. It is also expected that these devices will operate in the field for many years with little to no maintenance, including battery replacement. Thus, power saving operations may be critical for these types of devices.

Another example of RedCap type devices with capabilities that differ from other UEs are surveillance devices (e.g., cameras). These devices are similar to the devices in the first example in that they are typically stationary and do not have stringent latency requirements. However, they may differ from the first example because these devices may be connected to a permanent power supply (although not required) and may have much higher upload data rates than many other UEs because of, for example, the video upload feeds they are providing.

Yet another example of RedCap type devices with different capabilities than many other UEs are wearable devices. Unlike the above examples, wearables typically have similar mobility to mobile phones and operations related to the same types of applications that are executable on mobile phones. However, because of the smaller form factor resulting in smaller batteries, these devices have a more stringent power saving requirement than mobile phones.

These examples of different types of UEs are by no means an exhaustive list of 5G-capable devices, but are provided as an example of the varying capabilities of different UEs that are connected to the 5G NR wireless network at any given time. Devices that are considered RedCap devices may be determined in various manners. For example, RedCap devices may be defined by the class of device (e.g., wearables, surveillance device, etc.). In another example, RedCap devices may be defined by the capability/functionality of the devices (e.g., battery life, processing power, latency requirements, etc.). The definition of what qualifies a UE as a RedCap UE may be set by standards (e.g., 3GPP standards) or may be left to the individual network provider.

In current standard releases, Random Access Channel (RACH) Response (RAR) messages intended for different UEs are multiplexed into a single jointly encoded transport block scheduled with a Random Access-Radio Network Temporary Identifier (RA-RNTI) in the Type1-PDCCH CSS (Physical Downlink Control Channel Common Search Space) sets. This may cause an issue for RedCap devices due to the reduced bandwidth and the reduced number of Rx antennas. For example, the maximum number of multiplexed RAR messages can be up to six to meet a 1% target Block Error Rate (BLER). The number of multiplexed RAR would be further reduced due to the reduced number of Rx antennas at the UE side. In addition, there may be a large number of RedCap devices deployed in the network. If a large number of RedCap UEs initiate a random access procedure, the RAR capability may become limited and increase the initial access latency due to RAR transmission blocking. Thus, there is a need to provide solutions for RedCap devices especially for coverage recovery cases to achieve a low RAR blocking probability.

According to some exemplary embodiments, a RedCap UE may monitor PDCCH candidates in Type1-PDCCH CSS sets configured by the random access search space (e.g., ra-SearchSpace) in the System Information Block (SIB1) for a Downlink Control Information (DCI) format with cyclic redundancy check (CRC) scrambled by a RA-RNTI, a MsgB-RNTI, or a Temporary Cell RNTI (TC-RNTI) on a primary cell. The exemplary monitoring will be described in greater detail below.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

The UE 110 may connect to the 5G NR-RAN 120 via at least one of the next generation nodeB (gNB) 120A and/or the gNB 120B. The exemplary embodiments may apply to any appropriate number of gNBs. For example, the UE may simultaneously connect to and exchange data with a plurality of gNBs in a multi-cell carrier aggregation (CA) configuration. Exemplary details of CA operation will be described below. The UE 110 may also connect to the LTE-RAN 122 via either or both of the eNBs 122A, 122B, or to any other type of RAN, as mentioned above.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
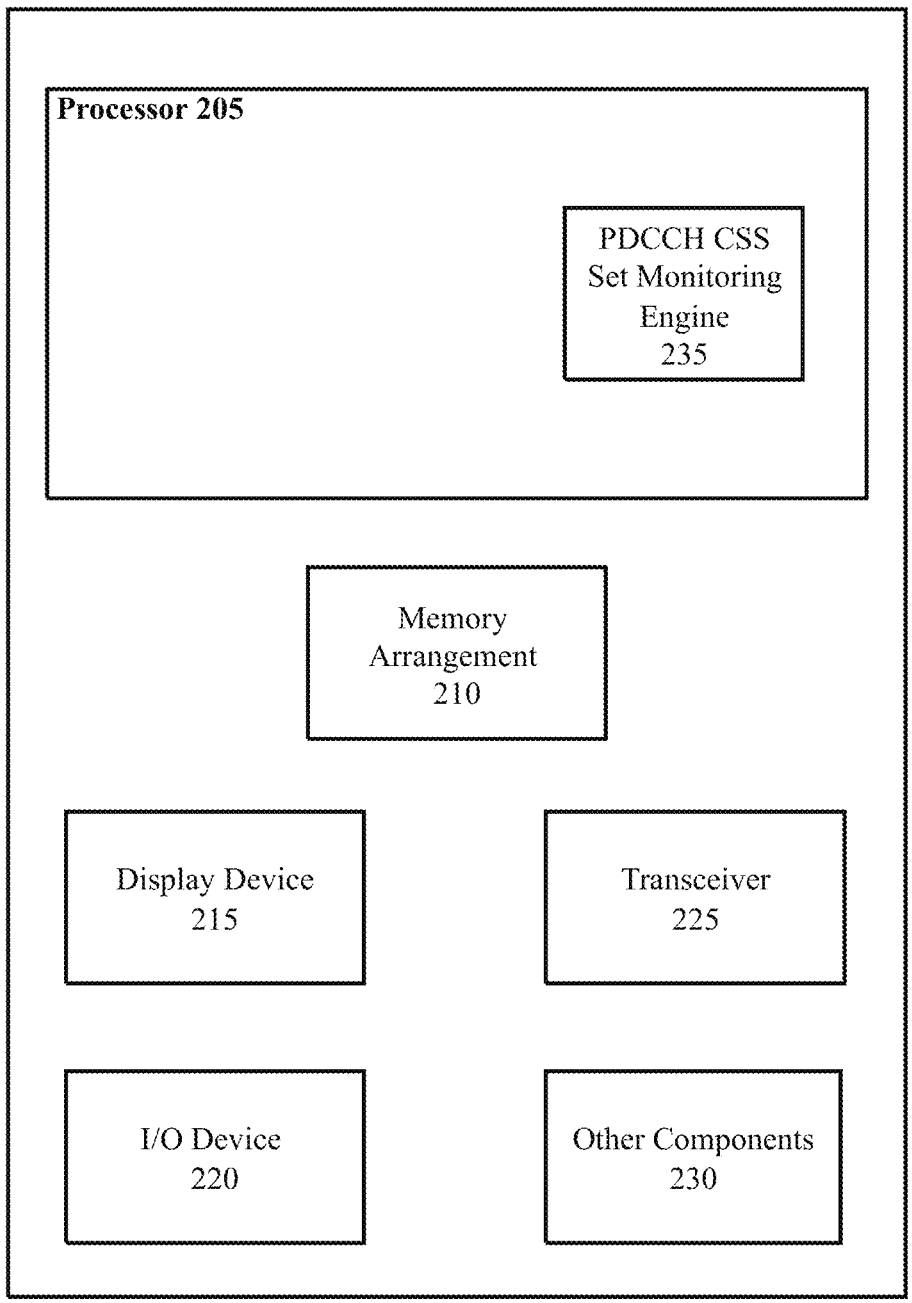
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. For purposes of this discussion, the UE 110 may be considered to be a reduced capability (RedCap) UE. However, it should be noted that the UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a PDCCH CSS Set monitoring engine 235. The PDCCH CSS Set monitoring engine 235 may perform various operations related to monitoring the PDCCH as will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
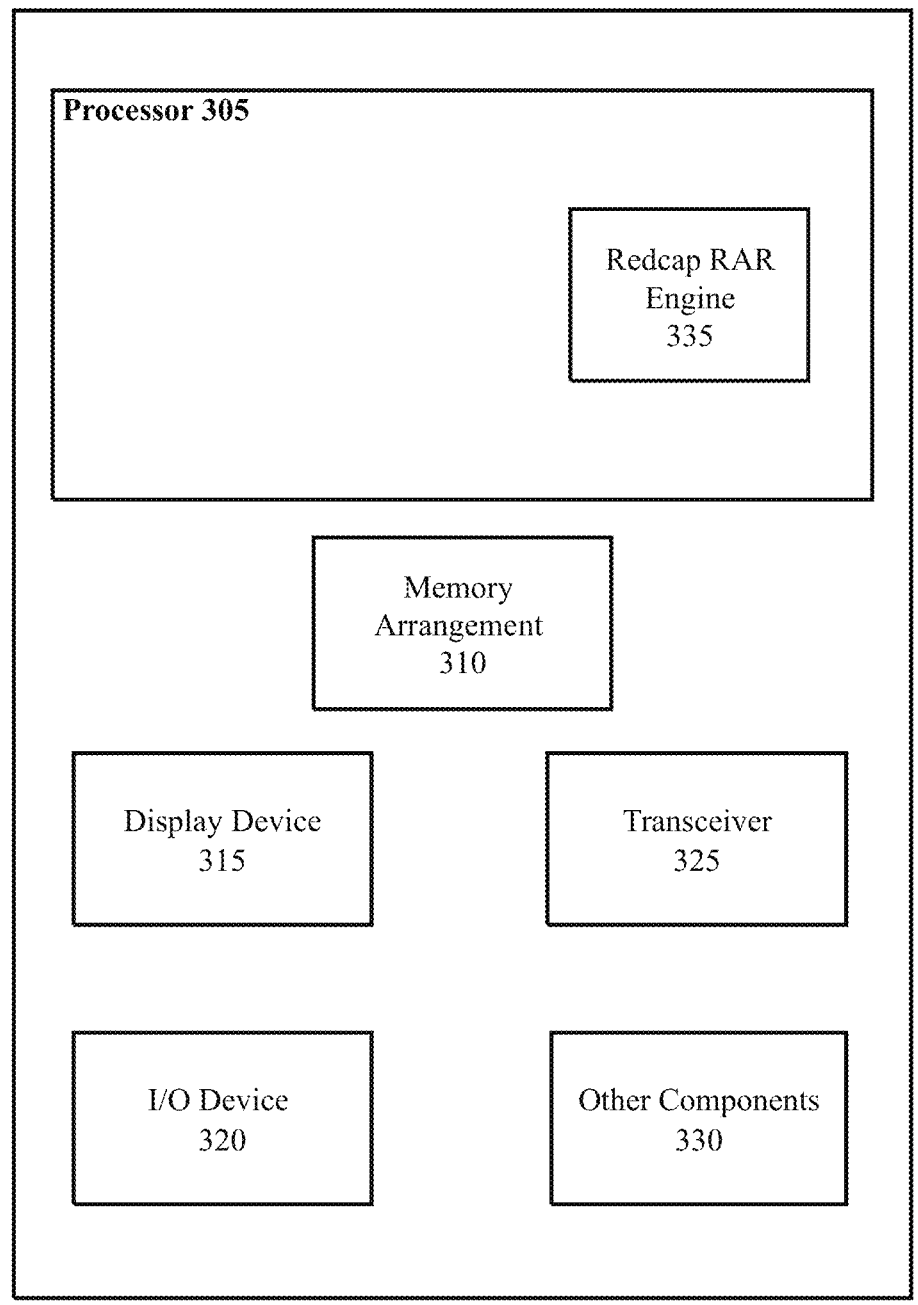
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent a cell providing services as a primary cell (PCell) or a secondary cell (SCell), or in a standalone configuration with the UE 110. The gNB 120A may represent any access node of the 5G NR network through which the UE 110 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a RedCap RAR engine 335 for sending RAR messages to RedCap devices. Examples of sending RAR messages to the RedCap devices will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

The exemplary embodiments are described with regard to carrier aggregation performed at a 5G NR network and including SCell activation mechanisms. However, the use of the 5G NR network is only exemplary. The exemplary embodiments may be modified and/or used with any network that supports carrier aggregation (CA) or a substantially similar functionality in which a plurality of component carriers (CCs) is used.

CA may include a primary component carrier (PCC) and at least one secondary component carrier (SCC) that correspond to the same radio access technology (RAT) being used to facilitate communication with the network. In addition, in 5G NR, Eutra NR Dual Connectivity (ENDC) may be enabled where a connection is established with both the 5G NR RAT and the LTE RAT, and the exemplary embodiments may be used. The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated. For example, with CA for LTE, there may be CC combinations that include, but are not limited to, two carriers, four carriers, five carriers, eight carriers, ten carriers, thirty-two carriers, etc. With CA for 5G NR there may be CC combinations that include, but are not limited to, two carriers, five carriers, ten carriers, twelve carriers, sixteen carriers, twenty carriers, twenty-five carriers, thirty-two carriers, sixty-four carriers, etc.

The exemplary system may be configured with CA functionality and comprise a PCell providing a PCC and at least one SCell respectively providing an SCC. The PCell may control how data is exchanged with the UE, such as how the PCC and any SCCs are to be used in the CA functionality. When the UE is CA capable, the CA functionality enables the PCell and a further SCell to combine bandwidths to exchange data with the UE to increase a rate of data exchange. Thus, with CA, the PCell may provide a first portion of a total bandwidth for data to be exchanged while the SCell may provide a second portion of the total bandwidth. When further SCells are used, the PCell may provide the first portion of the total bandwidth, the first SCell may provide the second portion of the total bandwidth, a second SCell may provide a third portion of the total bandwidth, and so on.

As described above, in some exemplary embodiments, a RedCap UE may monitor a component carrier (CC) of a primary cell (PCell) for PDCCH candidates in Type1-PDCCH CSS sets configured by the random access search space (e.g., ra-SearchSpace) in the System Information Block (SIB1) for a Downlink Control Information (DCI)

format with cyclic redundancy check (CRC) scrambled by a RA-RNTI, a MsgB-RNTI, or a Temporary Cell RNTI (TC-RNTI).

Figure 4A:
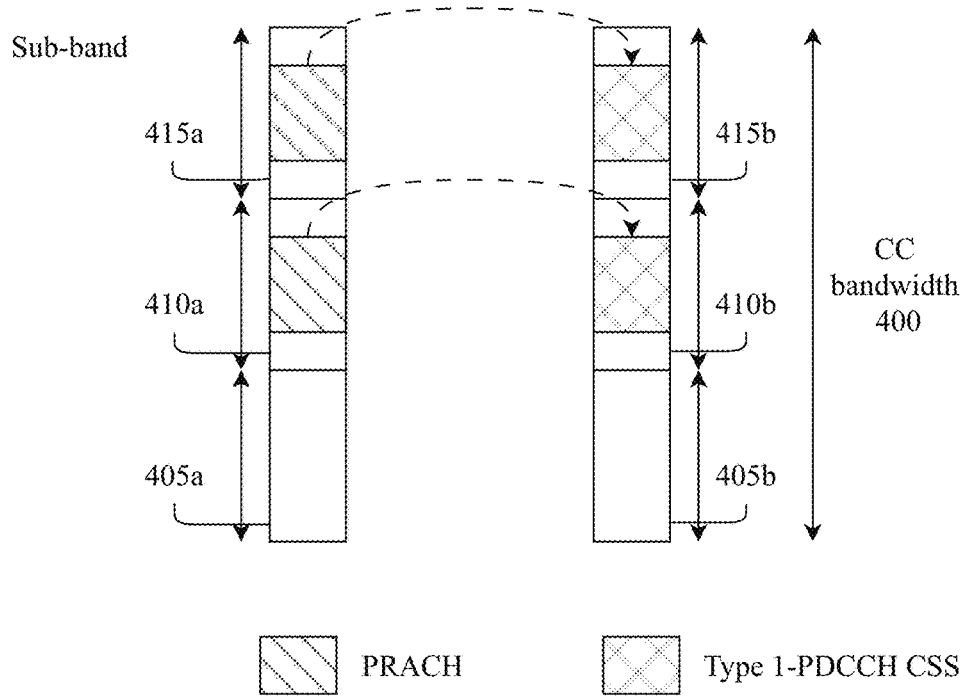
FIGS. 4A and 4B show a component carrier (CC) bandwidth divided into sub-bands according to various exemplary embodiments.
Figure 4B:
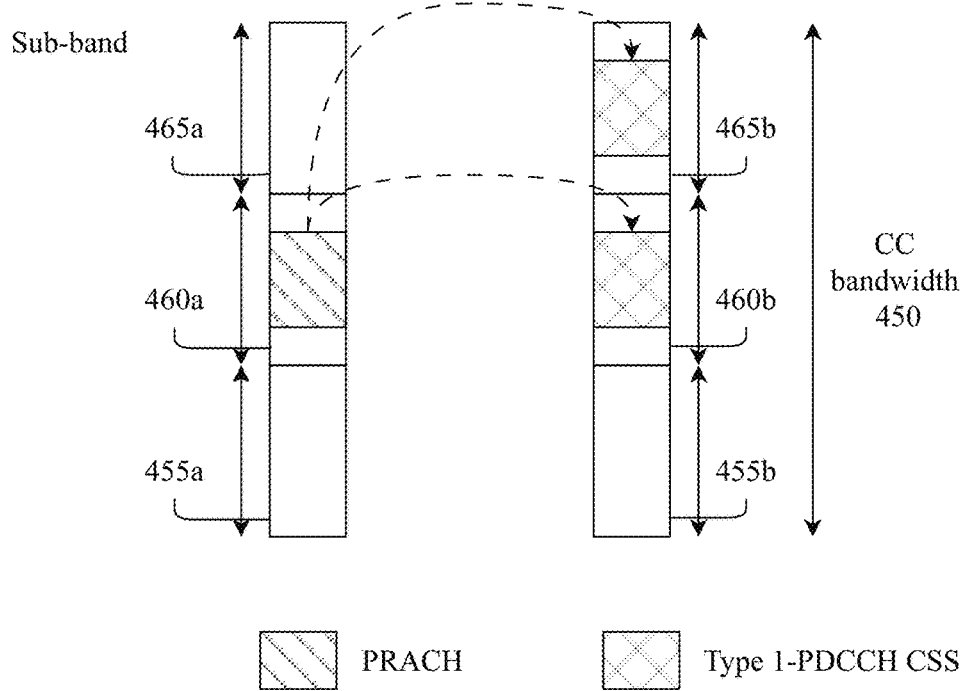

FIGS. 4A and 4B show a component carrier (CC) bandwidth 400, 450 divided into sub-bands according to various exemplary embodiments. In the example of FIGS. 4A and 4B, each of the CC bandwidths 400, 450 are divided into three sub-bands, 405a,b, 410a,b, 415a,b, and 455a,b, 460a,b, 465a,b, respectively. The left sub-bands of FIGS. 4A and 4B labeled with the (a) may be considered the frequency resources used for the physical random access channel (PRACH) and the right sub-bands of FIGS. 4A and 4B labeled with the (b) may be considered the frequency resources used for the Type1-PDCCH CSS sets.

It should be understood that a CC bandwidth may be divided into any number of sub-bands. In some exemplary embodiments, the CC bandwidth may be divided into $n_{SB}$ sub-bands based on:

$$n_{SB} = N_{cc}^{size}/N_{subband}^{size}$$

where $N_{cc}^{size}$ represents the downlink (DL) bandwidth configuration expressed in units of resource blocks (RBs) and $N_{subband}^{size}$ is the number of RBs of each sub-band, which may be a function of the DL CC bandwidth or fixed by standards (e.g., a minimum bandwidth (BW) of RedCap devices) or implicitly indicated by a Physical Broadcast Channel (PBCH) (e.g., equals to the size of CORESET 0). The $n_{SB} > 0$ may be numbered in increasing order starting from lowest frequency.

In some exemplary embodiments, for RedCap devices, the Type1-PDCCH CSS sets associated with one PRACH resource may be transmitted in the same sub-band as the corresponding PRACH. FIG. 4A shows an example of this type of exemplary embodiment. In the example of FIG. 4A, the PRACH resources are shown as being in sub-bands 410a and 415a. Thus, because there is a one-to-one correspondence between the PRACH resources and the Type1-PDCCH CSS sets, the corresponding Type1-PDCCH CSS sets are shown as being in sub-bands 410b and 415b.

In other exemplary embodiments, for RedCap devices, the Type1-PDCCH CSS sets associated with one PRACH resource may be transmitted in a different sub-band. FIG. 4B shows an example of this type of exemplary embodiment. In the example of FIG. 4B, the PRACH resource is shown as being in sub-bands 460a. However, the corresponding Type1-PDCCH CSS sets are shown as being in sub-bands 460b and 465b. When the PRACH and Type1-PDCCH CSS sets are in different sub-bands, as in this example, the UE needs to determine which the sub-band includes the Type1-PDCCH CSS sets because unlike the example of FIG. 4A, it is not a one-to-one correspondence between the PRACH resources and the Type1-PDCCH CSS sets.

In some exemplary embodiments, the associated Type1-PDCCH CSS may be explicitly signaled in an information element (IE) associated with a RACH (e.g., RACH-Config-Generic IE of SIB1) and may depend on the value of the msg-FDM IE. Those skilled in the art will understand that the msg-FDM IE specifies how many RO are allocated in the frequency domain (at the same location in time domain). For example, the RACH-ConfigGeneric IE may include the msg-FDM IE corresponding to an identification of a particular search space (e.g., SearchSpaceID). The RACH-ConfigGeneric IE may further include a field that identifies a sub-band identification of the corresponding DL sub-band that includes the Type1-PDCCH CSS sets. This field may include a series of bits (e.g., bitmap string) where each bit corresponds to a sub-band. The sub-band identification field may be conditionally set based on whether the network supports RedCap functionality, e.g., if the network supports the RedCap functionality, the sub-band identification field will be included in the RACH-ConfigGeneric IE.

In some exemplary embodiments, instead of broadcasting the sub-band-ID for RedCap devices in SIB1, the legacy controlResourceSetId may be leveraged by allowing the associated CORESET for Type1-PDCCH CSS sets to be located outside of initial DL BWP. In these exemplary embodiments, the RedCap devices may monitor Type1-PDCCH CSS for the corresponding RNTIs in another BWP other than initial DL BWP and the switched BWP with Type1-PDCCH CSS monitoring becomes the active BWP for the serving cell.

Figure 5:
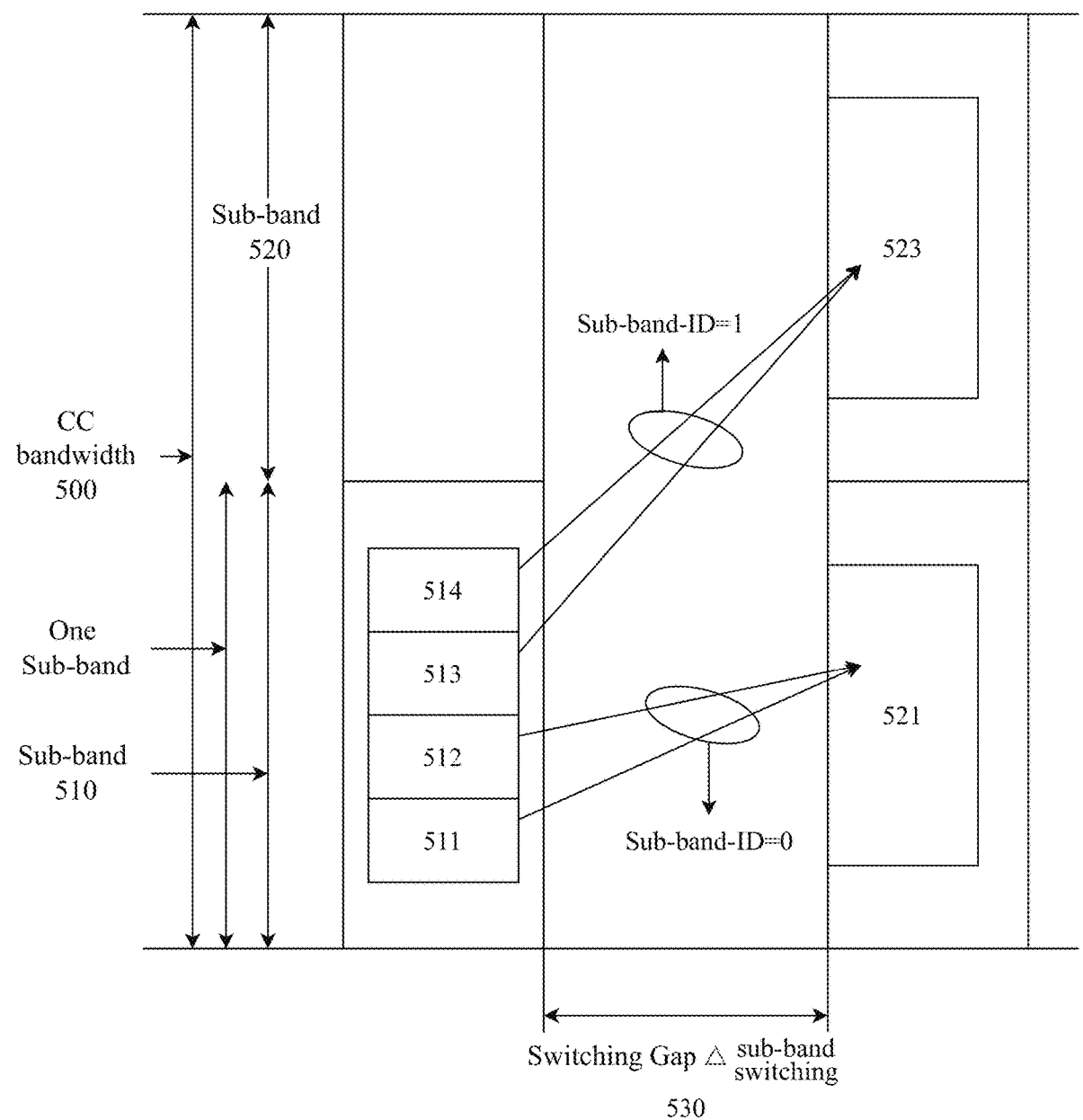
FIG. 5 shows an example of sub-band switching when the Type1-PDCCH CSS (Physical Downlink Control Channel Common Search Space) sets are located in a different sub-band than the physical random access channel (PRACH) according to various exemplary embodiments.

FIG. 5 shows an example of sub-band switching when the Type1-PDCCH CSS sets are located in a different sub-band than the PRACH according to various exemplary embodiments. In this example, it may be considered that the CC bandwidth 500 is divided into two sub-bands 510 and 520. As can be seen in FIG. 5, the sub-band 510 includes PRACH resources 511-514, while there are corresponding Type1-PDCCH CSS sets 521 and 523 in sub-bands 510 and 520, respectively, e.g., PRACH resources 511 and 512 correspond to Type1-PDCCH CSS set 521 in sub-band 510 and PRACH resources 513 and 514 correspond to Type1-PDCCH CSS set 523 in sub-band 520.

In some exemplary embodiments, when the corresponding Type1-PDCCH CSS set is located in a different DL BWP than the selected PRACH resource as shown with PRACH resources 513 and 514 and Type1-PDCCH CSS set 523, the UE will monitor the Type1-PDCCH CSS set 523 for which there is a time gap between the last symbol of the PRACH transmission and the first symbol of the associated Type1-PDCCH CSS transmission. This time gap may be referred to as $\Delta_{switching}^{sub\text{-}band}$ as is shown by the switching gap 530 in FIG. 5. This time gap may be larger than or equal to a predefined threshold to allow the UE to monitor the different BWP for the Type1-PDCCH CSS transmission. The predefined threshold may be based on, for example, a subcarrier spacing. If the bandwidth part being monitored does not change compared to the PRACH transmission, e.g., the UE is monitoring the Type1-PDCCH CSS set 521 in sub-band 510 corresponding to PRACH resources 511 and 512, no bandwidth switch will occur and the switching gap may be set to 0.

In some exemplary embodiments, different PRACH resources in a same PRACH occasion in the frequency domain may be associated with different RA-RNTIs. As described above, this may increase the Type1-PDCCH capacity given the large amount of PRACH load requirement of RedCap devices. The RA-RNTI associated with the PRACH occasion in which the random access preamble is transmitted may be computed as follows:

RA-RNTI=1+s_id+14×t_id+14×80×f_id+14×80×8× ul_carrier_id+sub-group-id×K

Where: s_id is the index of the first OFDM symbol of the PRACH occasion (0≤s_id<14);

t_id is the index of the first slot of the PRACH occasion in a system frame (0≤t_id<80);

f_id is the index of the PRACH occasion in the frequency domain (0≤f_id<8);

ul_carrier_id is the UL carrier used for Random Access Preamble transmission 0 for NUL carrier, and 1 for SUL); and sub-group-id is determined at least based on the number of sub-groups within a PRACH occasion that are associated with Type1-PDCCH CSS monitoring in a respective sub-band.

As can be seen from the above equation, by introducing the sub-group-id, PRACH resources in different sub-groups may be associated with different RA-RNTIs allowing more than one Type1-PDCCH CSS transmissions to be scheduled in a single sub-band. This allows for flexibility and increases the probabilities for scheduling Type1-PDCCH transmissions compared to Rel-15/Rel-16 systems.

Figure 6:
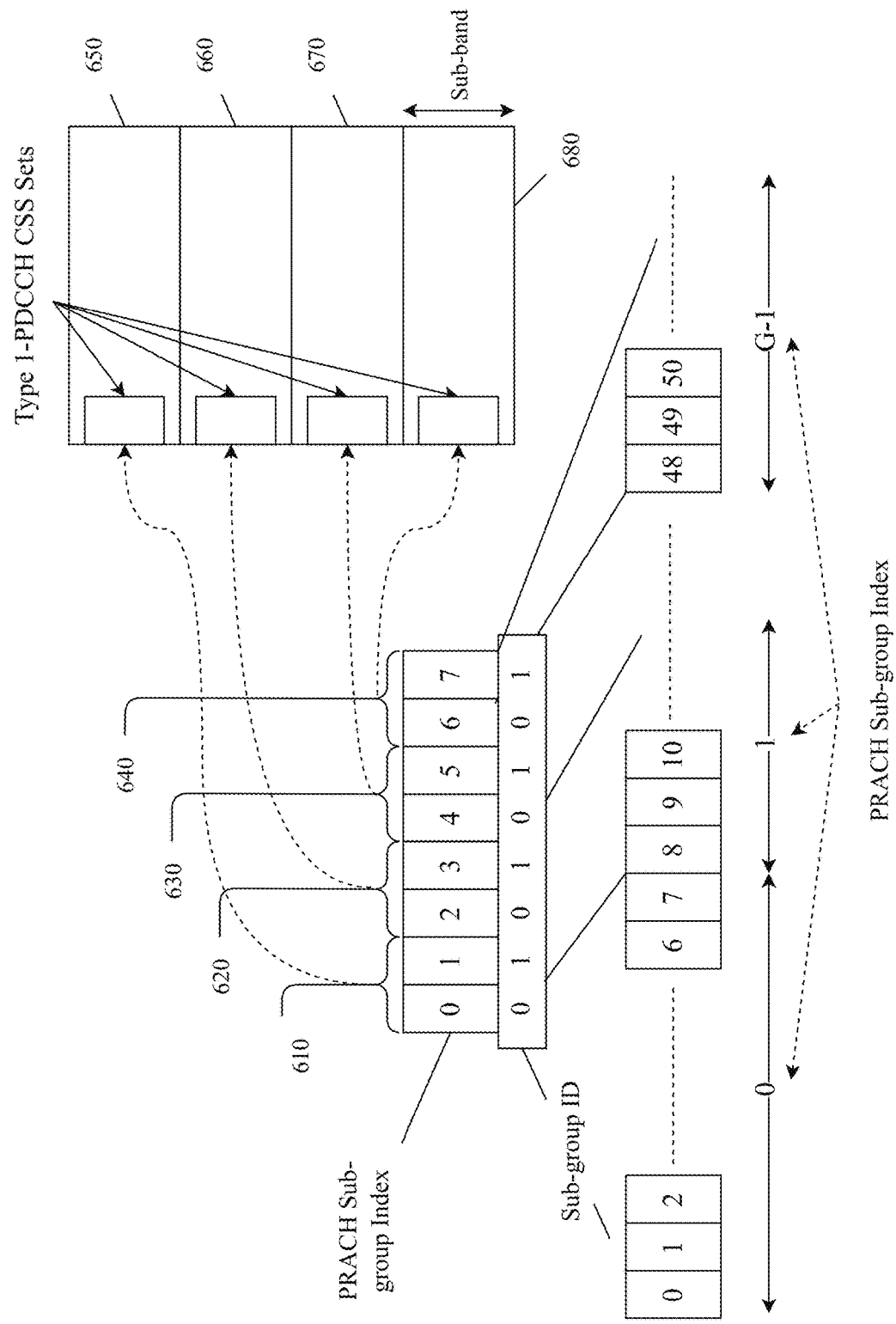
FIG. 6 shows an example of PRACH sub-group indexing according to various exemplary embodiments.

FIG. 6 shows an example of PRACH sub-group indexing 600 according to various exemplary embodiments. In the example of FIG. 6, it may be considered that there are G PRACH sub-groups, these sub-groups and have an index from 0, . . . , G-1 (or 0, . . . , 7 as shown in FIG. 6). Each sub-group includes eight PRACH resources as shown below the sub-groups, e.g., sub-group 0 has PRACH resources 0-7. The sub-groups 0-7 may also be further grouped into mid-groups consisting of two consecutive sub-groups, e.g., sub-groups 0 and 1 are included in mid-group 610, sub-groups 2 and 3 are included in mid-group 620, sub-groups 4 and 5 are included in mid-group 630, sub-groups 6 and 7 are included in mid-group 640. In each mid-group, two RA-RNTIs may be generated for Type1-PDCCH CSS monitoring in a single sub-band associated with the two PRACH sub-groups to reduce latency.

Figure 7:
FIG. 7 shows an example of a mapping table corresponding to the example of FIG. 6 according to various exemplary embodiments.

It may also be considered that the UE is provided with a mapping table to associate sub-groups in a mid-group and Type1-PDCCH CSS sub-band index. FIG. 7 shows an example of a mapping table 700 corresponding to the example of FIG. 6 according to various exemplary embodiments. Thus, by referring to the table 700, it can be seen that the group 610 corresponds to the Type1-PDCCH CSS sets in sub-band 650, the group 620 corresponds to the Type1-PDCCH CSS sets in sub-band 660, the group 630 corresponds to the Type1-PDCCH CSS sets in sub-band 670 and the group 640 corresponds to the Type1-PDCCH CSS sets in sub-band 680.

Those skilled in the art will understand that the above-described exemplary embodiments may be implemented in any suitable software or hardware configuration or combination thereof. An exemplary hardware platform for implementing the exemplary embodiments may include, for example, an Intel x86based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A base station of a wireless network, comprising:
a transceiver configured to connect to a user equipment (UE); and
a processor communicatively coupled to the transceiver and configured to perform operations comprising:
dividing a component carrier (CC) bandwidth into a plurality of sub-bands;
transmitting a physical random access channel (PRACH) resource on at least one of the sub-bands; and
transmitting a Type1-PDCCH CSS (Physical Downlink Control Channel Common Search Space) set on at least one of the sub-bands, wherein the Type1-PDCCH CSS set corresponds to the PRACH resource, wherein the PRACH resource and the Type1-PDCCH CSS set are transmitted on different sub-bands and wherein a switching gap is predefined between transmitting the PRACH resource and the Type1-PDCCH CSS set, wherein the predefined switching gap is based on a sub-carrier spacing and is larger than or equal to a threshold.

2. The base station of claim 1, wherein the at least one of the sub-bands on which the Type1-PDCCH CSS set is transmitted is identified in a System Information Block (SIB) corresponding to the PRACH resource.

3. The base station of claim 1, wherein the at least one of the sub-bands on which the Type1-PDCCH CSS set is transmitted is identified using a controlResourceSetId.

4. The base station of claim 1, wherein different PRACH resources in a same PRACH occasion are associated with different random access-Radio Network Temporary Identifiers (RA-RNTI).

5. The base station of claim 4, wherein the different PRACH resources comprise indexed sub-groups corresponding to the at least one sub-band for the Type1-PDCCH CSS set.

6. One or more processors configured to perform operations comprising:
dividing a component carrier (CC) bandwidth into a plurality of sub-bands;
transmitting a physical random access channel (PRACH) resource on at least one of the sub-bands; and
transmitting a Type1-PDCCH CSS (Physical Downlink Control Channel Common Search Space) set on at least one of the sub-bands, wherein the Type1-PDCCH CSS set corresponds to the PRACH resource, wherein the PRACH resource and the Type1-PDCCH CSS set are transmitted on different sub-bands and wherein a switching gap is predefined between transmitting the PRACH resource and the Type1-PDCCH CSS set, wherein the predefined switching gap is based on a sub-carrier spacing.

7. The one or more processors of claim 6, wherein the at least one of the sub-bands on which the Type1-PDCCH CSS set is transmitted is identified in a System Information Block (SIB) corresponding to the PRACH resource.

8. The one or more processors of claim 6, wherein the at least one of the sub-bands on which the Type1-PDCCH CSS set is transmitted is identified using a controlResourceSetId.

9. The one or more processors of claim 6, wherein different PRACH resources in a same PRACH occasion are associated with different random access-Radio Network Temporary Identifiers (RA-RNTI).

10. The one or more processors of claim 9, wherein the different PRACH resources comprise indexed sub-groups corresponding to the at least one sub-band for the Type1-PDCCH CSS set.

11. A method, comprising:
dividing a component carrier (CC) bandwidth into a plurality of sub-bands;
transmitting a physical random access channel (PRACH) resource on at least one of the sub-bands; and
transmitting a Type1-PDCCH CSS (Physical Downlink Control Channel Common Search Space) set on at least one of the sub-bands, wherein the Type1-PDCCH CSS set corresponds to the PRACH resource wherein the PRACH resource and the Type1-PDCCH CSS set are transmitted on different sub-bands, wherein a switching gap is predefined between transmitting the PRACH resource and the Type1-PDCCH CSS set, wherein the predefined switching gap is based on a sub-carrier spacing.

12. The method of claim 11, wherein the at least one of the sub-bands on which the Type1-PDCCH CSS set is transmitted is identified in a System Information Block (SIB) corresponding to the PRACH resource.

13. The method of claim 11, wherein different PRACH resources in a same PRACH occasion are associated with different random access-Radio Network Temporary Identifiers (RA-RNTI).

* * * * *